(12) United States Patent
Mourad et al.

(10) Patent No.: US 10,339,831 B2
(45) Date of Patent: Jul. 2, 2019

(54) SMART DRILL GUIDE DEVICE FOR MUSCLE TRAINING OF HAND DRILLING OPERATIONS

(71) Applicant: United Arab Emirates University, Al Ain (AE)

(72) Inventors: Abdel Hamid Ismail Mourad, Al Ain (AE); Azza Abdulla Alshehhi, Al Ain (AE); Maryam Salem Al Kaabi, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 320 days.

(21) Appl. No.: 14/947,372

(22) Filed: Nov. 20, 2015

(65) Prior Publication Data

US 2017/0148351 A1 May 25, 2017

(51) Int. Cl.
*B23B 49/02* (2006.01)
*G09B 19/00* (2006.01)
*G09B 19/24* (2006.01)
*G09B 5/00* (2006.01)

(52) U.S. Cl.
CPC .............. *G09B 19/24* (2013.01); *B23B 49/02* (2013.01); *G09B 5/00* (2013.01); *G09B 19/003* (2013.01); *B23B 2260/128* (2013.01); *B23B 2270/32* (2013.01); *B23B 2270/483* (2013.01); *B23B 2270/486* (2013.01)

(58) Field of Classification Search
None
See application file for complete search history.

(56) References Cited

U.S. PATENT DOCUMENTS

| | | | | | |
|---|---|---|---|---|---|
| 2,837,939 | A | * | 6/1958 | Leitner | B25H 1/0078 408/110 |
| 2,953,045 | A | * | 9/1960 | Carles | B25H 1/0042 408/110 |
| 2,997,900 | A | * | 8/1961 | Pugsley | B25H 1/0021 144/1.1 |

(Continued)

OTHER PUBLICATIONS

Hand Drill Fire; 2013; https://www.youtube.com/watch?v=7bdfz6WluRs.*

*Primary Examiner* — Eddy Saint-Vil
*Assistant Examiner* — William D Ermlick
(74) *Attorney, Agent, or Firm* — Hayes Soloway PC (57) ABSTRACT

A drill guide device comprising a speed detection device for measuring speed of a drill bit used by the device for drilling an object surface during a hand drilling operation; a force detection device for measuring force applied by the drill bit on the object during the hand drilling operation; an alignment detection device for detecting alignment of the drill bit with respect to the object surface during the hand drilling operation; a user interface connected to the speed detection device, the force detection device and the alignment detection device adapted to communicate to a user information related to the speed, the force and the alignment of the drill bit during the hand drilling operation. The drill guide device is preferably used for training technicians on hand drilling the object surface using a required range of force, speed and alignment, particularly muscle memory training of technicians on these required parameters.

22 Claims, 7 Drawing Sheets

(56) References Cited

U.S. PATENT DOCUMENTS

| | | | | |
|---|---|---|---|---|
| 3,707,043 A | * | 12/1972 | Jones | B25H 1/0092 33/1 N |
| 3,890,058 A | * | 6/1975 | Self | B25H 1/0078 408/112 |
| 3,979,165 A | * | 9/1976 | Pyle | B25H 1/0078 408/110 |
| 4,072,440 A | * | 2/1978 | Glover | B25H 1/0078 408/112 |
| 4,328,621 A | * | 5/1982 | Benjamin | B25J 13/08 33/534 |
| 4,338,723 A | * | 7/1982 | Benjamin | B25J 13/08 33/534 |
| 4,386,532 A | * | 6/1983 | Benjamin | B25J 13/08 33/535 |
| 4,406,069 A | * | 9/1983 | Clement | G01B 5/245 33/520 |
| 4,723,911 A | * | 2/1988 | Kurtz | A61C 1/00 408/16 |
| 4,923,341 A | * | 5/1990 | Cameron | B25F 3/00 408/112 |
| 5,314,271 A | * | 5/1994 | Christiano | B25H 1/0057 408/111 |
| 5,601,566 A | * | 2/1997 | Dance | A61B 17/154 606/102 |
| 6,536,536 B1 | * | 3/2003 | Gass | B23B 31/123 173/171 |
| 6,813,843 B1 | * | 11/2004 | Faubion | B23Q 17/2233 33/520 |
| 6,860,682 B1 | * | 3/2005 | Le Picq | B25H 1/0078 408/112 |
| 7,375,361 B2 | * | 5/2008 | Turner | B25H 1/0092 250/559.29 |
| 7,992,311 B2 | * | 8/2011 | Cerwin | B23B 49/006 33/286 |
| 8,375,541 B1 | * | 2/2013 | Beachy | B23B 47/281 29/26 A |
| 8,463,421 B2 | * | 6/2013 | Brett | B23Q 15/013 408/1 R |
| 9,114,494 B1 | * | 8/2015 | Mah | B23Q 17/2233 |
| 9,248,510 B2 | * | 2/2016 | Martinez Quintero | B23B 49/02 |
| 9,554,812 B2 | * | 1/2017 | Inkpen | G01B 7/003 |
| 9,573,257 B2 | * | 2/2017 | Kynast | B25B 23/18 |
| 9,669,473 B2 | * | 6/2017 | Ponton | B23B 49/02 |
| 9,676,073 B2 | * | 6/2017 | Schubert | B23Q 17/2233 |
| 2002/0104207 A1 | * | 8/2002 | Smith | B23B 41/00 29/26 A |
| 2004/0221466 A1 | * | 11/2004 | Faubion | B23Q 17/2233 33/645 |
| 2005/0251294 A1 | * | 11/2005 | Cerwin | B25F 5/022 700/279 |
| 2005/0265799 A1 | * | 12/2005 | Hartsfield, Jr. | B23B 47/287 408/110 |
| 2006/0085092 A1 | * | 4/2006 | Redecker | B23Q 1/0009 700/175 |
| 2006/0208577 A1 | * | 9/2006 | Richter | B25F 5/00 307/326 |
| 2006/0272123 A1 | * | 12/2006 | Di Nicolantonio | B23B 47/00 15/415.1 |
| 2007/0118116 A1 | * | 5/2007 | Feiler | A61B 17/1703 606/54 |
| 2007/0217878 A1 | * | 9/2007 | Byrd | B25H 1/0078 408/16 |
| 2007/0256861 A1 | * | 11/2007 | Hulick | E21B 4/20 175/26 |
| 2008/0047333 A1 | * | 2/2008 | Turrini | G05B 19/4065 73/104 |
| 2009/0260239 A1 | * | 10/2009 | Cerwin | B23B 49/006 33/286 |
| 2010/0041004 A1 | * | 2/2010 | Meglan | G09B 23/283 434/262 |
| 2010/0274121 A1 | * | 10/2010 | Ritchey | A61B 5/05 600/424 |
| 2011/0245833 A1 | * | 10/2011 | Anderson | A61B 17/1626 606/80 |
| 2011/0318126 A1 | * | 12/2011 | Cornelius | B23B 39/14 408/1 R |
| 2012/0103643 A1 | * | 5/2012 | Binder | B25D 16/003 173/2 |
| 2012/0275874 A1 | * | 11/2012 | Richt | B23B 45/008 408/124 |
| 2013/0071195 A1 | * | 3/2013 | Schevers | B23B 49/00 408/16 |
| 2014/0007442 A1 | * | 1/2014 | Pettersson | B25H 1/0092 33/626 |
| 2014/0048298 A1 | * | 2/2014 | Fuchs | B25B 21/00 173/1 |
| 2014/0166323 A1 | * | 6/2014 | Cooper | B23Q 11/0092 173/1 |
| 2015/0066035 A1 | * | 3/2015 | McGinley | A61B 17/16 606/80 |
| 2015/0182285 A1 | * | 7/2015 | Yen | G05B 15/02 606/80 |
| 2017/0113316 A1 | * | 4/2017 | Barr | B23Q 17/20 |
| 2017/0120438 A1 | * | 5/2017 | Kynast | B25H 1/0085 |

* cited by examiner

ISOMETRIC VIEW

SMART DRILL GUIDE DEVICE FOR MUSCLE TRAINING OF HAND DRILLING OPERATIONS

FIELD OF THE INVENTION

The present invention relates to a drill guide device, and more particularly to a smart drill guide device for muscle training of hand drilling operations for reducing or eliminating the likelihood of mistakes occurring while manufacturing expensive structural components or systems, in particular in the aerospace industry.

BACKGROUND OF INVENTION

The aerospace industry is expensive and very sensitive to any mistake as the costs involve human lives. Manufacturing process of the airplane is of a significant importance and has to be done in extreme accuracy as a small scratches or mistake in connections might lead to lose an aircraft that worth millions of dollars.

Hand drilling of holes on flat surfaces, using pneumatic drill motors, of aircraft components is still carried out and is yet not fully automated which may lead to some costly mistakes. Equipping the technicians with better tools and training them can reduce these mistakes.

Traditional drill guide devices have use limitations due to the relatively large size of the device which is an important parameter to consider since drilling will be done on curved surfaces as well as straight ones and also because the already known drill guide devices are not equipped to give the operator with any indication of the drilling speed, the force applied to the piece nor the inclination degree. Without these indications the probability of damaging the material or causing an accident is very high. However, it is very important that a drilling operation meets force, speed and alignment requirements and specifications.

The prior art failed to suggest hand drilling devices for training purposes which can train technicians successfully with hand drilling operations.

SUMMARY OF THE INVENTION

Therefore there is a need for a hand drilling device for training purposes including training the muscle memory of technicians on the speed, orientation and force required for hand drilling operations on desired objects so that they are able to comply with requirements and specifications such as comfort, alignments, force, speed, flexibility, durability, precision and cost. More particularly there is a need to provide a device and a method for drilling surfaces using said device that gives a real time indication of the alignment, speed and force applied during drilling operations which technicians can obtain during training drilling operations to adjust alignment, speed and force applied using the drilling device as a function of the drilling requirements.

As a first aspect of the present invention, there is provided a drill guide device comprising:
  a speed detection device for measuring speed of a drill bit used by the device for drilling an object surface during a hand drilling operation;
  a force detection device for measuring force applied by the drill bit on the object during the hand drilling operation;
  an alignment detection device for detecting alignment of the drill bit with respect to the object surface during the hand drilling operation;
  a user interface connected to the speed detection device, the force detection device and the alignment detection device adapted to communicate to a user information related to the speed, the force and the alignment of the drill bit during the hand drilling operation.

The drill guide device further comprising a microcontroller adapted to be connected to the user interface and to the speed detection device, the force detection device and the alignment detection device for comparing the force, speed and alignment measurements to a predefined required range of force, speed and alignment and for communicating a non-compliance signal to the user interface in case the measurements are not within the predefined required range.

In a preferred embodiment the user interface comprises a display for displaying the speed, force and alignment related information.

In a preferred embodiment wherein the speed detection device comprises a speed sensor adapted to detect a rotational speed of the drill bit. Preferably the speed sensor is a hall effect sensor or is a pressure sensor.

In a preferred embodiment the force detection device comprises a load cell. Preferably the force detection device further comprises a load frame structure having an upper portion for receiving and supporting the object surface during the drilling operation, a lower portion for supporting the load frame structure to the ground, and an intermediary portion between the upper and lower portions for receiving the load cell such that the force applied on the object surface during the drilling operation is transferred to the load cell for measurement.

In a preferred embodiment the alignment detection device comprises:
  a drill guide base having supporting members adapted to sit on the drilling surface during the drilling operation and an opening adapted to guide the drill bit through to the object surface in a way that all the supporting members are in physical contact with the object surface;
  contact sensors at said supporting members respectively for detecting whether said supporting members are in physical contact with the object surface;
  wherein said alignment detection device detects lack of alignment when at least one supporting member is not in physical contact with the object surface.

Preferably, the alignment detection device is configured to detect the perpendicularity of the drill bit with respect to the object surface during the drilling operation.

Preferably the contact sensors comprise gyroscope sensors or switches sensors. More preferably the contact sensors are push button switches sensors.

In another preferred embodiment the microcontroller is adapted to be connected to an ignition system of a hand drill device for deactivating the hand drill device in case the measurements are not within the predefined required range. Preferably the drill guide base comprises a body having:
  a central body portion defining the drill guide base opening, wherein said opening has an opening axis;
  a peripheral body portion around the central portion comprising the plurality of supporting members; and
  a cavity within the peripheral body portion for receiving the contact sensors at said supporting members.

More preferably the drill guide device further comprising a bushing adapted to be mounted centrically within the guide base opening to act as a guide for the drill bit and to protect the drill guide base from being damaged by the drill bit. The drill guide further comprises a holder adapted to be coupled to the drill guide base for enabling a user to hold the base on the object surface using a single hand during the drilling operation, wherein preferably, said holder comprises a housing adapted to house the microcontroller and a battery in such a manner to be in electrical connection with the contact sensors.

In a preferred embodiment, the supporting members have a height defining a distance between the guide base opening and the object surface during the drilling operation in order to allow space for any left out material resulting from the drilling operation, wherein preferably the push button switches sensors comprise switch on/off pins and wherein supporting members have openings adapted to receive the pins such that the pins extend outside the supporting members through the openings, wherein the switch on/off pins are adapted to be connected to a switch for generating a signal indicative of whether the switch on/off pins are in physical contact with the drilling surface.

In a preferred embodiment of the present invention the object surface is flat or curved.

The drill guide device of the present invention further comprising a force measurement sensor adapted to measure the force applied to drill the openings.

The present invention also relates to a computer-implemented process for drilling an object surface of a work piece, said process comprising:

measuring alignment, speed and force applied by a user on an object surface using a drilling device during a drilling operation;

comparing the measured alignment, speed and force with a predefined required range of force, speed and alignment; and communicating a non-compliance signal to the user in case the measured alignment, speed and force rare not within the predefined required range.

Preferably, the computer-implemented process further comprising:

deactivating the drilling device from operation in case the measured alignment, speed and force rare not within the predefined required range.

The present invention also relates to the use of the drill guide device for training technicians on hand drilling the object surface using a required range of force, speed and alignment, preferably wherein said training comprises a muscle memory of the technicians or said training comprises reducing mistakes occurring during the hand drilling operation.

DETAILED DESCRIPTION OF THE INVENTION

The most important parameters and specifications for the drill guide base and its holder are as follow:

Flexibility: the drill guide base should be of a relatively small size so that to fit in any space and also to be able to allow the operator to drill on curved surfaces as well as on planar ones. The relatively small size of the device also allows the operator to have better visibility during the drilling operation.

Interface: should report figures clearly, accurately and without a delay.

Comfort: the shape and the material of device should be designed in a manner that doesn't harm or annoy the operators when used for a long time, and Speed, alignment and force Measurement: these specifications, which are one of the main objectives of the present invention, are controlled using sensors which are specific to provide the required information.

Drill Guide Base: The Concept

The exemplary embodiments described herein detail for illustrative purposes are subject to many variations.

Figure 1:
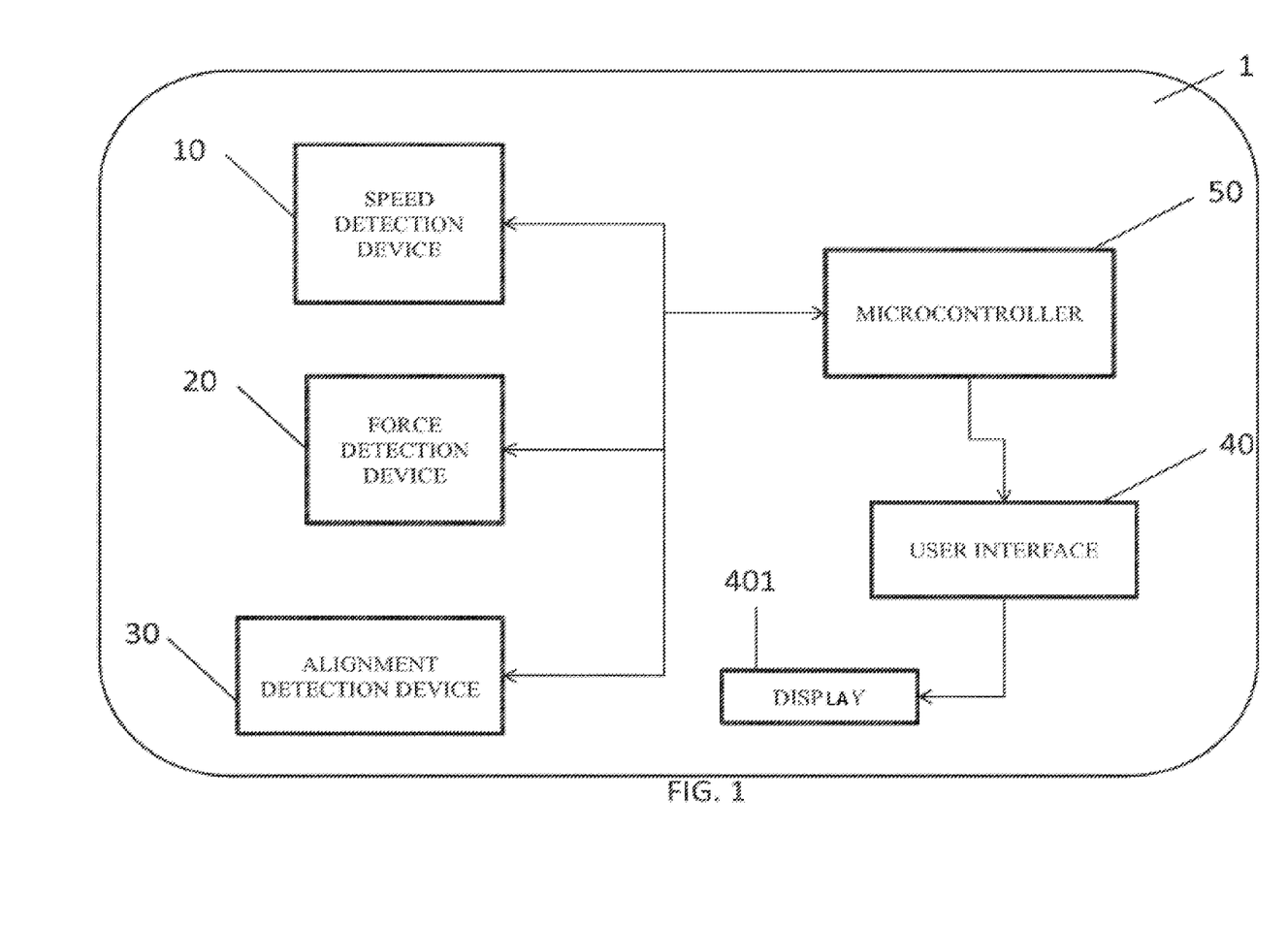
FIG. 1 is a bloc diagram illustrating the connections between the user interface and the speed, force and alignment detections devices in accordance with an embodiment of the invention.

FIG. 1 illustrates a block diagram representing different components of the drill guide device 1 used during hand drilling operation. The drill guide device 1 of the present invention comprises a speed detection device 10, a force detection device 20 and an alignment detection device 30; the device 1 further comprises a user interface 40 adapted to be connected to a speed detection device 10, a force detection device 20 and an alignment detection device 30. The user interface 40 is adapted to communicate to a user the information related to the speed, force and alignment of the drill bit during the hand drilling operation. The device 1 further comprises a microcontroller 50 adapted to be connected to the user interface 40 and to the speed, force and alignment detection devices 10, 20 & 30 for comparing the measurements of these three parameters to a predefined required range of force, speed and alignment and for communicating a non-compliance signal to the user interface 40 in case the measurements are not within the predefined required range. The communication with the user can be conducted in any suitable manner, including by text or voice.

Force, speed and alignment can be of any order. Alignment can be between 0 and 180 degrees, however in the preferred embodiment the alignment desired is perpendicularity (90 degrees) with respect to the object surface.

The user interface 40 preferably further comprises a display 401 for displaying to the user the information related to the speed, force and alignment so that the user can control and also adjust the hand drilling operation to the required measurement specifications. The user interface 40 can also generate a vocal message to the user about the non compliance.

Preferably, the user interface 40 is further adapted to enable a user to specify the required range of force, alignment and speed. The user interface 40 is adapted to communicate this information to the microcontroller 50. The user interface 40 can have a touch key board for example or any other type of input interface for receiving the information from the user.

In a preferred embodiment the microcontroller 50 is adapted to be connected to an ignition system (Not shown)

of a hand drill device 1 for deactivating the hand drill device 1 in case the measurements are not within the predefined required range. In this way, the eventual mistakes that may occur during the hand drilling operation are reduced or even avoided.

The speed detection device 10 comprises a speed sensor adapted to detect a rotational speed of the drill bit, examples of the speed sensor types used in the present invention are, but not limited to, hall effect sensor and pressure sensor. In the case where the pressure sensor is used, the speed of drill is measured through the pressure which is then converted into round per minute (rpm) values and then displayed through a display 401 for the user.

Figure 2:
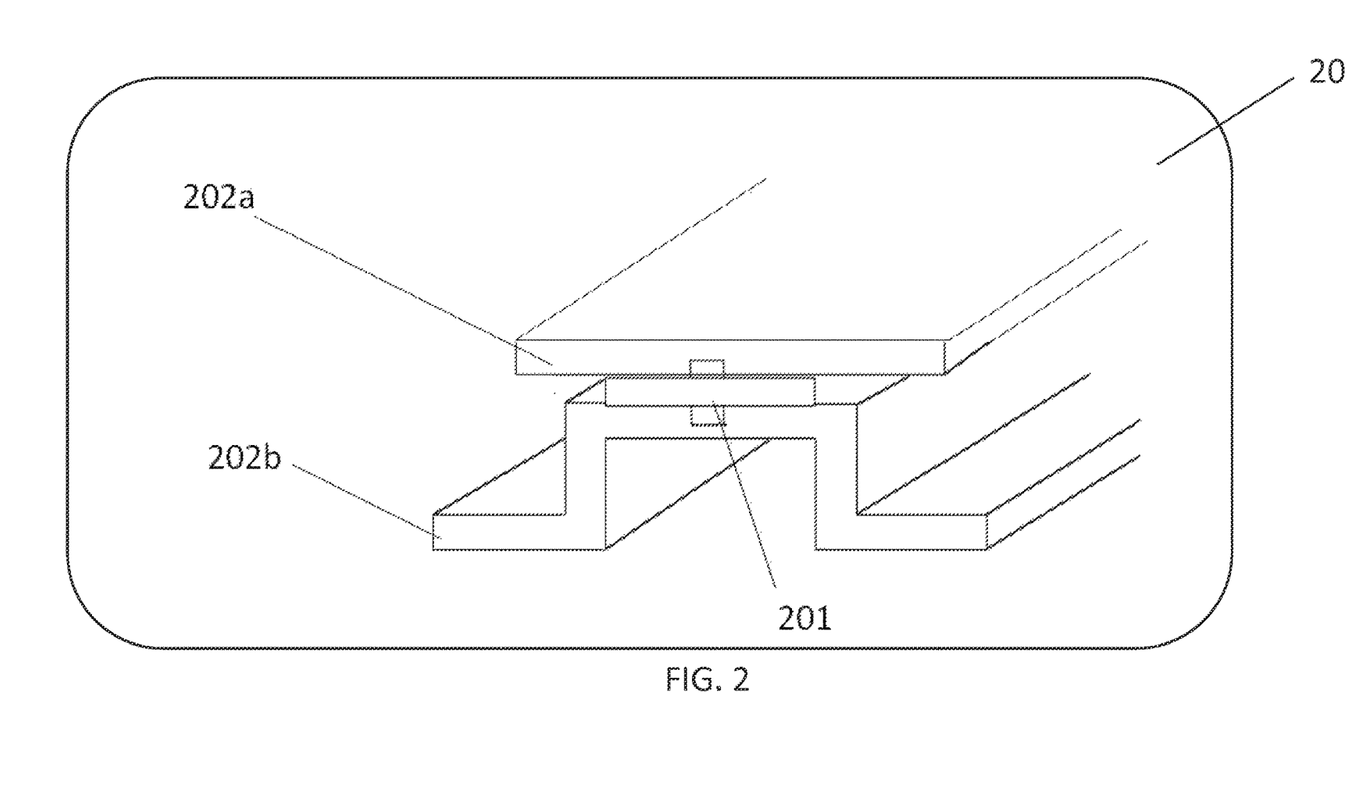
FIG. 2 illustrates the load cell-working station (load frame structure) in accordance with an embodiment of the invention.

As illustrated in FIG. 2, the force detection device 20 comprises a load frame structure (also called load cell assembly) 200 and a load cell 201 adapted to measure the amount of force exerted on the drilling surface by the user during the hand drilling operation. The load frame structure 200 comprises an upper portion 202a for receiving and supporting the object surface during the drilling operation and a lower portion 202b for supporting the load frame structure to the ground. The load cell 201 is placed between the upper portion 202a and the lower portion 202b such that the force applied on the object surface during the drilling operation is transferred to the load cell 201 for measurement.

Examples of load cells used in the present invention are, but not limited to, strain-gage load cells or piezoelectric load cells. These cells are used for applications where the load may go from tension to compression and vice versa. They are suitable for space restricted environments. Threaded ends facilitate easy installation. The gauges are bonded onto a structural member that deforms when weight is applied. In most cases, four strain gages are used to obtain maximum sensitivity and temperature compensation. Two of the gauges are usually in tension, and two others are in compression. When weight is applied, the strain changes the electrical resistance of the gauges in proportion to the load.

The force detection device 20 is adapted to be connected to the user interface 40 for communicating the amount of force being exerted during drilling operations so that the user can be guided to either reduce or increase the force. The force detection device 20 is also preferably connected to the microcontroller 50 in order to be compared with the predefined force requirement.

Drill Guide Base

Figure 3:
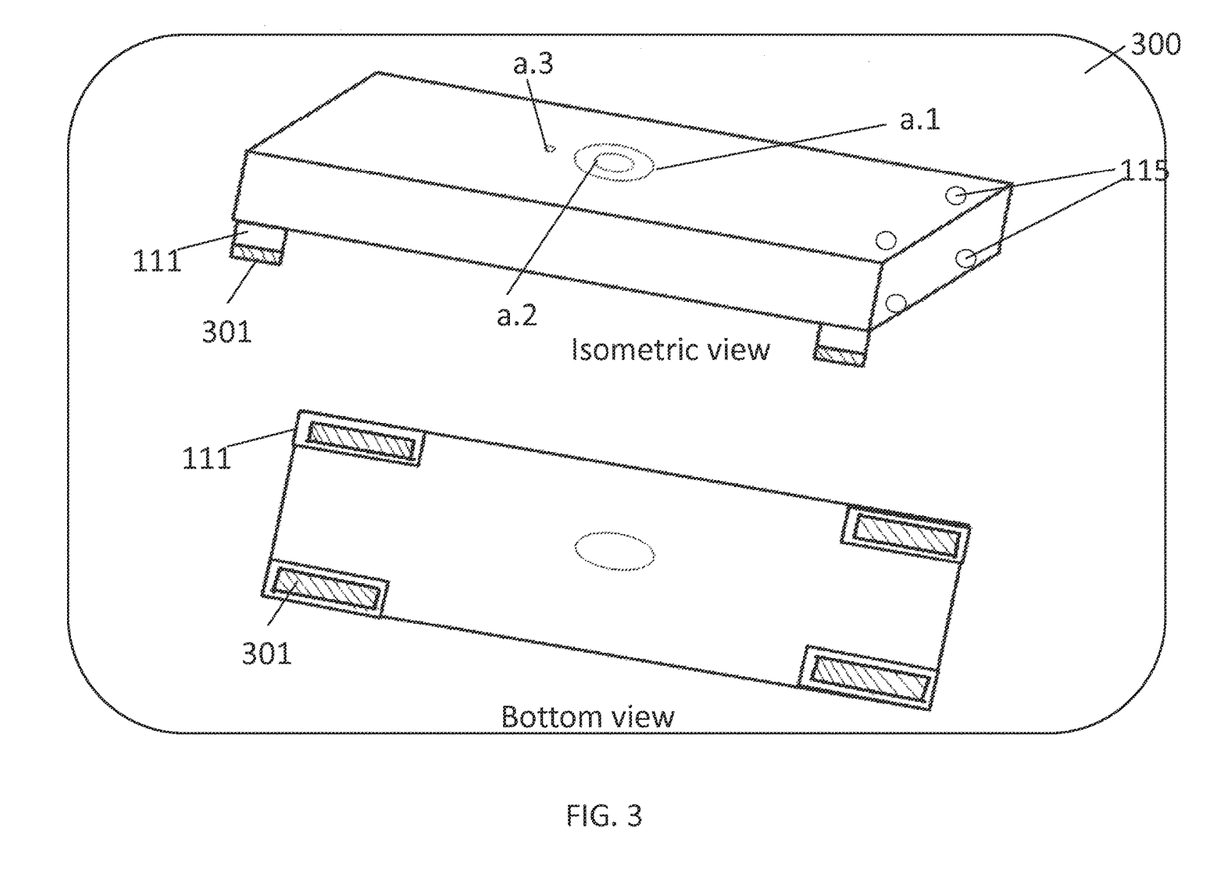
FIG. 3 illustrates a drill guide base in accordance with another embodiment of the invention.

FIG. 3 illustrates a drill guide base 300 according to one embodiment of the present invention. The drill guide base 300 comprises a plurality of supporting members 111 extending therefrom. The supporting members may have two or more supporting members, for example two, three four or five supporting members. Preferably three or four, more preferably four supporting members. The supporting members 111 may have a square, a rectangular or any other type of shape suitable to receive the contact sensors 301 that secure the alignment of the drill guide base 300 and its holder on the surface. The supporting members 111 are also adapted to support the body over a drilling surface having a drilling surface plan such that the opening axis is according to the alignment desired to the drilling surface plan only when the plurality of supporting members are all in physical contact with the drilling surface.

In the preferred embodiment of the invention, the alignment desired is perpendicularity and the drill guide base 300 is configured in consequence. However, it should be understood that alignment can be according to any desired angle between the drill bit and the object surface.

After levelling the drill guide base 300 perpendicularly using the sensors, the holder is fixed on the drill guide base 300 through counter bore screws 115 located on one side of the drill guide base 300. In this way, the drill guide base 300 is always calibrated as far as perpendicularity or alignment is concerned. The drill bit passes through a central portion defining a guide opening having an opening axis a.1 to hit the piece. The central opening a.1 may have from about 6 mm to about 14 mm in a diameter. Preferably the central opening a.1 may have about 11.81 mm in diameter in order to fit the drill head and hold it firmly while the drill bit goes through the 8 mm diameter opening a.2 to hit the piece. Another opening a.3 of about 2 mm diameter has been added next to the opening a.1 in which a small pin of 2 mm diameter is fitted into it to assure that the bushing is fixed while drilling.

It is to be understood that the perpendicularity alignment or the property of being perpendicular means that the alignment of two objects intersect at a right angle of 90 degrees, i.e. at the point of intersection the straight angle on one side of the alignment of the first object is cut by the second line forming and intersection angle of 90 degrees. A skilled person in the art would understand without any doubt the perpendicularity property between two lines.

In a preferred embodiment, the drill device base may also comprise a bushing (not shown) installed into the central opening a.1 t to act as a guide for the drill bit and to protect the drill guide base from being damaged by the drill bit. The bushing component is standard component with different bore diameter and may also be made by any suitable tough material such as alloy steel.

The drill guide base 300 of the present invention can be made by any suitable material that enhances the performance of the system. Examples of materials that can be used are, but not limited to, Poly(methyl methacrylate) PMMA (trade names Plexiglas, Acrylite, and Perspex) aluminium, wood or polymeric material. The use of aluminium material is preferred due to its enhanced properties such as low density and therefore lightweight, high strength, superior malleability, easy machining and excellent corrosion resistance; although other suitable material can also be used.

The alignment detection device 30 of the present invention comprises alignment measurement sensors or contact sensors 301 placed at supporting members 111. The supporting members 111 are adapted to sit on the drilling surface during the drilling operation and an opening a.1 adapted to guide the drill bit through to the object surface in a perpendicular manner when all the supporting members are in physical contact with the object surface.

Examples of alignment measurement sensors or contact sensors 301 are, but not limited to, a gyroscope sensor or switches sensors such as a push button switches sensors.

Figure 4:
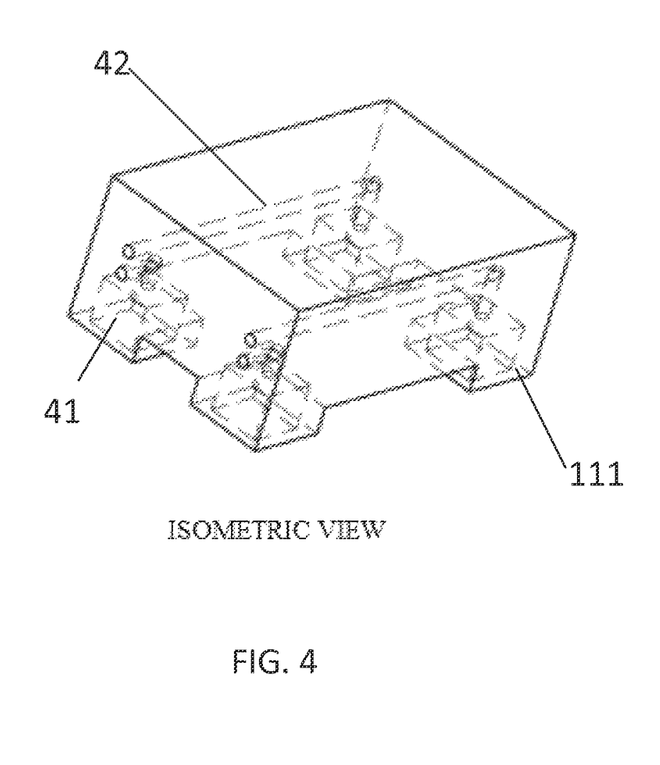
FIG. 4 illustrates a drill guide base in accordance with a further embodiment of the invention.

A circuit of switches may be used in order to give an indication of the alignment of the drill guide base. FIG. 4 illustrates an example of the allocation of circuit switches 41 as alignment sensor and the passages for wire connections 42 with the rest of the device. The supporting members 111 have a hollow structure adapted to accommodate the switches 41 and the switch circuits 42.

In case when all switches 41 are on, the circuit sends a signal to a LED (not shown) giving the start up sign for the user or the technician to start drilling the piece. If the drill guide base is not perfectly aligned with the work surface of the object, then one or more of the switches 41 will be off and the circuit will be opened thus causing no signal indication and thus displaying information to the user to not start.

Figure 5:
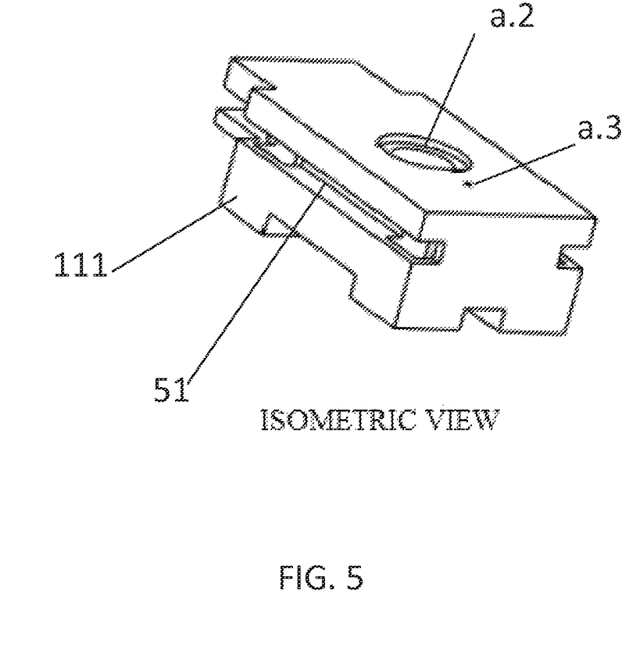
FIG. 5 illustrates a drill guide base in accordance with another embodiment of the invention.

For easy manipulation of the drill guide device, the drill guide base 300 may further comprise side slots 51 for ease wire insertion of the cables that connect the alignment sensors to the interface used for displaying the alignment measurement result. (See FIG. 5).

Drill Guide Holder

Figure 6A:
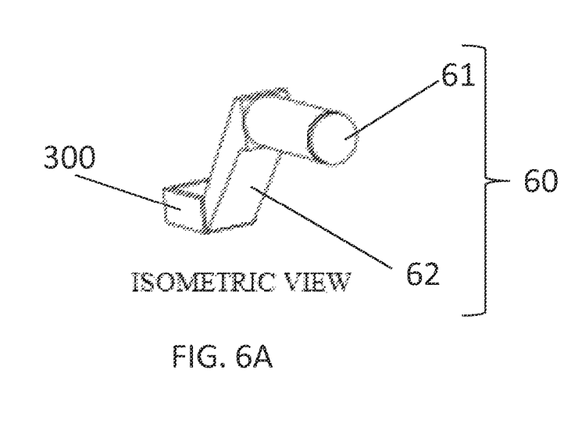
FIGS. 6A, 6B and 6C illustrate three embodiments of a drill guide holder in accordance with the invention.
Figure 6B:
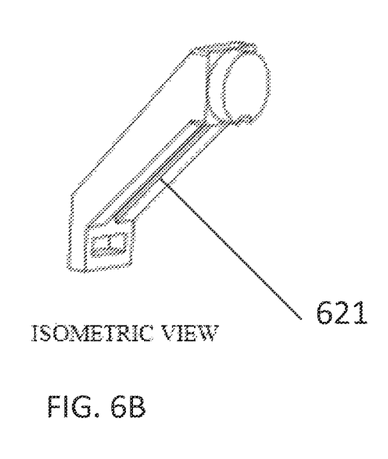

FIG. 6 illustrates different features of the drill guide holder 60 according to a preferred embodiment of the present invention. The drill guide holder is designed to facilitate holding the drill guide base 300 during the drilling process. FIG. 6A illustrates the drill guide holder 60 comprising a handle 61 and a connector 62 connecting the handle 61 with the drill guide base 1. A battery (not shown) is preferably located inside the handle 61. Cables and wires are connected to both battery and sensors located in the drill guide base 300 and are preferably located in the connector 62. FIG. 6B illustrates a preferred embodiment of the connector 62 having slots 621 suitable to allocate the cables therein.

Figure 6C:
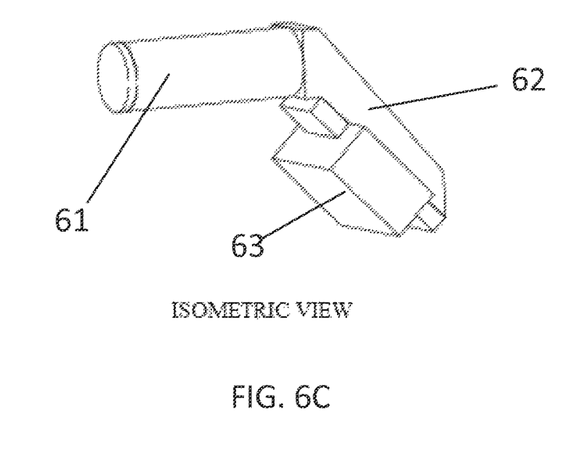

FIG. 6C illustrates another embodiment of the present invention, in which the drill guide holder 60 further comprises a housing 63 for the microcontroller 50.

Final Design Concept

Figure 7:
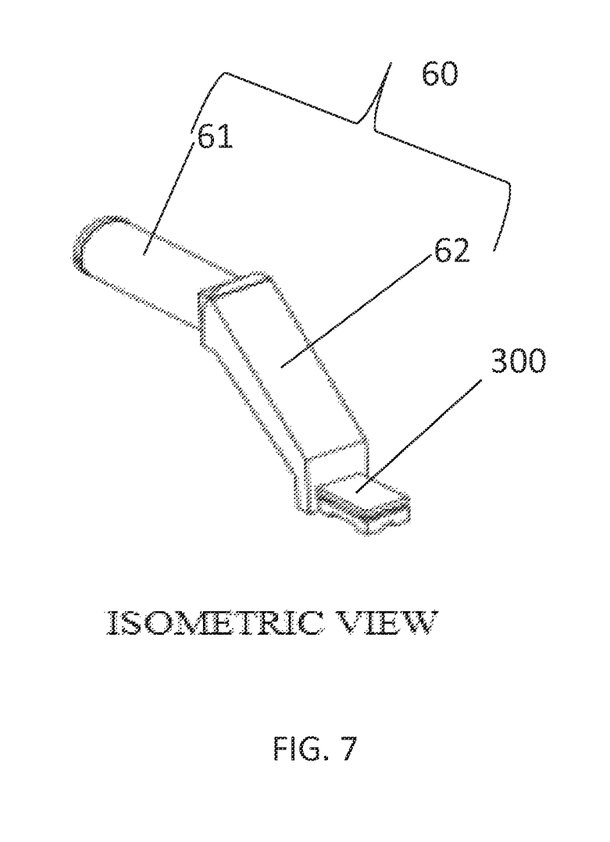
FIG. 7 illustrates assembly drawing of the drill guide base and the holder system in accordance with an embodiment of the invention.

FIG. 7 illustrates the drill guide device assembly system. The drill guide base 300 and drill guide holder 60 shown in the previous sections were integrated together forming the full assembly of the system. As shown in FIG. 7, the drill guide device 300 is assembled from one side to the holder system in such way that the drilling machine can easily be adapted and fixed to the drill guide base in a required position and alignment.

The invention claimed is:

1. A drill guide device for training users on hand drilling operations, the device comprising:
    a speed detection device for measuring speed of a drill bit used by the drill guide device for drilling an object surface during a hand drilling operation;
    a force detection device for measuring force applied by the drill bit on the object surface during the hand drilling operation;
        wherein the force detection device comprises a load cell;
    an alignment detection device for detecting alignment of the drill bit with respect to the object surface during the hand drilling operation;
        wherein the alignment detection device comprises a drill guide base held using a drill guide holder connected with a handle;
        wherein the force detection device is integral with the handle; and
    a user interface connected to the speed detection device, the force detection device and the alignment detection device for communicating to a user information related to the measured speed, the measured force and the detected alignment of the drill bit during the hand drilling operation;
    wherein the training on hand drilling operations is provided based on a predefined required range of speed, force and alignment measurement specifications, thereby diminishing mistakes while manufacturing structural components or systems.

2. The drill guide device as claimed in claim 1 further comprising a microcontroller adapted to be connected to the user interface and to the speed detection device, the force detection device and the alignment detection device for comparing the force, speed and alignment measurements to the predefined required range of force, speed and alignment and for communicating a non-compliance signal to the user interface in case the measurements are not within the predefined required range.

3. The drill guide device as claimed in claim 2 wherein the microcontroller is adapted to be connected to an ignition system of a hand drill device for deactivating the hand drill device in case the measurements are not within the predefined required range.

4. The drill guide device as claimed in claim 1, wherein the user interface comprises a display for displaying the speed, force and alignment related information.

5. The drill guide device as claimed in claim 1, wherein the speed detection device comprises a speed sensor adapted to detect a rotational speed of the drill bit.

6. The drill guide device as claimed in claim 5 wherein the speed sensor is a hall effect sensor.

7. The drill guide device as claimed in claim 1, wherein the force detection device further comprises a load frame structure having an upper portion for receiving and supporting the object surface during the drilling operation, a lower portion for supporting the load frame structure to the ground, and an intermediary portion between the upper and lower portions for receiving the load cell such that the force applied on the object surface during the drilling operation is transferred to the load cell for measurement.

8. The drill guide device as claimed in claim 1, wherein the drill guide base comprises:
    supporting members adapted to sit on the drilling surface during the drilling operation and an opening adapted to guide the drill bit through to the object surface according to the alignment required when all the supporting members are in physical contact with the object surface;
    contact sensors at said supporting members respectively for detecting whether said supporting members are in physical contact with the object surface;
    wherein said alignment detection device detects lack of alignment when at least one supporting member is not in physical contact with the object surface.

9. The drill guide device as claimed in claim 8, wherein the alignment desired is perpendicularity and the alignment detection device is configured to detect the perpendicularity of the drill bit with respect to the object surface during the drilling operation.

10. The drill guide device as claimed in claim 8, wherein the contact sensors comprise gyroscope sensors or switches sensors.

11. The drill guide device as claimed in claim 10, wherein the switches sensors are push button switches sensors.

12. The drill guide device of claim 11 wherein the push button switches sensors comprise switch on/off pins and wherein supporting members have openings adapted to receive the pins such that the pins extend outside the supporting members through the openings, wherein the switch on/off pins are adapted to be connected to a switch for generating a signal indicative of whether the switch on/off pins are in physical contact with the drilling surface.

13. The drill guide device as claimed in claim 8 wherein the drill guide base comprises a body having:
    a central body portion defining the drill guide base opening, wherein said opening has an opening axis;
    a peripheral body portion around the central portion comprising the plurality of supporting members; and
    a plurality of cavities within the peripheral body portion for receiving the contact sensors at said supporting members.

14. The drill guide device as claimed in claim 13 further comprising a bushing adapted to be mounted centrically within the drill guide base to act as a guide for the drill bit and to protect the drill guide base from being damaged by the drill bit.

15. The drill guide device as claimed in claim 14 wherein the holder is adapted to be coupled to the drill guide base for enabling a user to hold the drill guide base on the object surface using a single hand during the drilling operation.

16. The drill guide device as claimed in claim 15 wherein said holder comprises a housing adapted to house the microcontroller and a battery in such a manner to be in electrical connection with the contact sensors.

17. The drill guide device of claim 13, wherein the supporting members have a height defining a distance between the guide base opening and the object surface during the drilling operation in order to allow space for any left out material resulting from the drilling operation.

18. The drill guide device of claim 1 wherein the object surface is flat or curved.

19. A process of training users on hand drilling operations using a hand drill device, said process comprising:
measuring alignment, speed and force applied by a user on an object surface during a drilling operation using speed sensors, alignment measurement sensors and a force detection device respectively,
wherein the alignment measurement sensors are placed at supporting members on a drill guide base held using a drill guide holder connected with a handle integral with the force detection device, and
the force detection device comprises a load cell;
obtaining alignment, speed and force measurements through a microcontroller;
comparing the measured alignment, speed and force measurements with a predefined required range of force, speed and alignment measurement specifications using the microcontroller; and
communicating a non-compliance signal to the user through a user interface in case the measured alignment, speed and force are not within the predefined required range of measurement specifications to avoid mistakes while manufacturing structural components or systems.

20. The process as claimed in claim 19 further comprising:
using the microcontroller connected to an ignition system of the hand drill device, for deactivating the hand drill device from operation in case the measured alignment, speed and force are not within the predefined required range of measurement specifications.

21. The process as claimed in claim 19 wherein said training on hand drilling operations comprises a muscle memory training of technicians based on the predefined required range of speed, force and alignment measurement specifications.

22. The process as claimed in claim 21 wherein said training on hand drilling operations is for reducing mistakes occurring by the users during the hand drilling operations.

* * * * *